United States Patent
Kuwajima

(10) Patent No.: US 7,855,856 B2
(45) Date of Patent: Dec. 21, 2010

(54) DISK DEVICE EMPLOYING A CSS SYSTEM HEAD SUPPORTING UNIT

(75) Inventor: Hideki Kuwajima, Kyoto (JP)

(73) Assignee: Panasonic Corporation, Osaka (JP)

( * ) Notice: Subject to any disclaimer, the term of this patent is extended or adjusted under 35 U.S.C. 154(b) by 943 days.

(21) Appl. No.: 11/575,354

(22) PCT Filed: Sep. 16, 2005

(86) PCT No.: PCT/JP2005/017113

§ 371 (c)(1),
(2), (4) Date: Mar. 15, 2007

(87) PCT Pub. No.: WO2006/033289

PCT Pub. Date: Mar. 30, 2006

(65) Prior Publication Data

US 2009/0122447 A1 May 14, 2009

(30) Foreign Application Priority Data

Sep. 22, 2004 (JP) ............................. 2004-275301

(51) Int. Cl.
*G11B 5/54* (2006.01)
*G11B 21/08* (2006.01)
(52) U.S. Cl. .............. 360/264.7; 360/264.9; 360/256.2; 360/256.3
(58) Field of Classification Search ...... 360/256–256.5, 360/264.7, 264.9
See application file for complete search history.

(56) References Cited

U.S. PATENT DOCUMENTS 5,566,375 A * 10/1996 Isomura .................... 360/256.2
6,392,845 B1 * 5/2002 Tsuda et al. ............. 360/264.9
6,590,853 B1 * 7/2003 Lee et al. .................... 369/222
6,633,457 B1 * 10/2003 Lin et al. ................. 360/264.9
6,664,663 B1 * 12/2003 Yeo .......................... 310/12.16

(Continued)

FOREIGN PATENT DOCUMENTS

JP          03-062373          3/1991

(Continued)

OTHER PUBLICATIONS

"Toshiba's 0.85-Inch HDD Is Set To Bring Multi-Gigabyte Capacities To Small, Powerful Digital Products"; Toshiba Press Release Dated Jan. 8, 2004.

(Continued)

*Primary Examiner*—Brian E Miller
(74) *Attorney, Agent, or Firm*—RatnerPrestia

(57) ABSTRACT

A disk drive includes a magnetic recording medium rotatably supported, a spindle motor for spinning the recording medium, a slider having a head, a supporting arm having the slider at a first end facing the recording medium, a bearing for holding the supporting arm rotatably along a recording surface of the medium and pivotably in a vertical direction with respect to the recording surface, a leaf spring giving thrusting force to a first end of the supporting arm toward the medium, and a driver for rotating the supporting arm along the recording surface. When the driver rotates the supporting arm along the recording surface and parks the head in a given evacuation area on the recording surface, a second end of the supporting arm is depressed.

15 Claims, 11 Drawing Sheets

U.S. PATENT DOCUMENTS

| | | | |
|---|---|---|---|
| 7,088,557 B2 * | 8/2006 | Miyamoto et al. | 360/265.2 |
| 7,230,798 B2 * | 6/2007 | Hashi et al. | 360/244.2 |
| 7,245,456 B2 * | 7/2007 | Hashi et al. | 360/244.2 |
| 7,298,592 B2 * | 11/2007 | Lee et al. | 360/265 |
| 7,365,947 B2 * | 4/2008 | Honda et al. | 360/265.7 |
| 7,468,865 B2 * | 12/2008 | Yang et al. | 360/244.2 |
| 2001/0048576 A1 * | 12/2001 | Kazmierczak | 360/264.7 |
| 2002/0126419 A1 | 9/2002 | Kuwajima et al. | |
| 2003/0043510 A1 | 3/2003 | Miyamoto et al. | |
| 2005/0254177 A1 * | 11/2005 | Suzuki et al. | 360/264.9 |

FOREIGN PATENT DOCUMENTS

| | | |
|---|---|---|
| JP | 2002-298523 | 10/2002 |
| JP | 2003-109337 | 4/2003 |

OTHER PUBLICATIONS

"Toshiba Enters Guinness World Records Book With The World's Smallest Hard Disk Drive"; Toshiba Press Release Dated Mar. 16, 2004.

International Search Report for application No. PCT/JP2005/017113 dated Dec. 20, 2005.

* cited by examiner

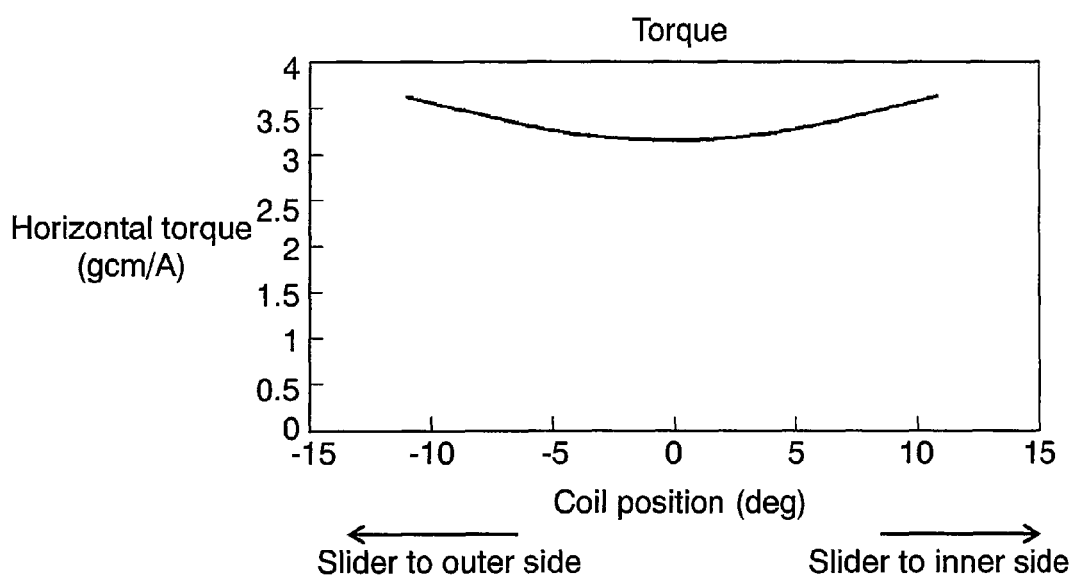
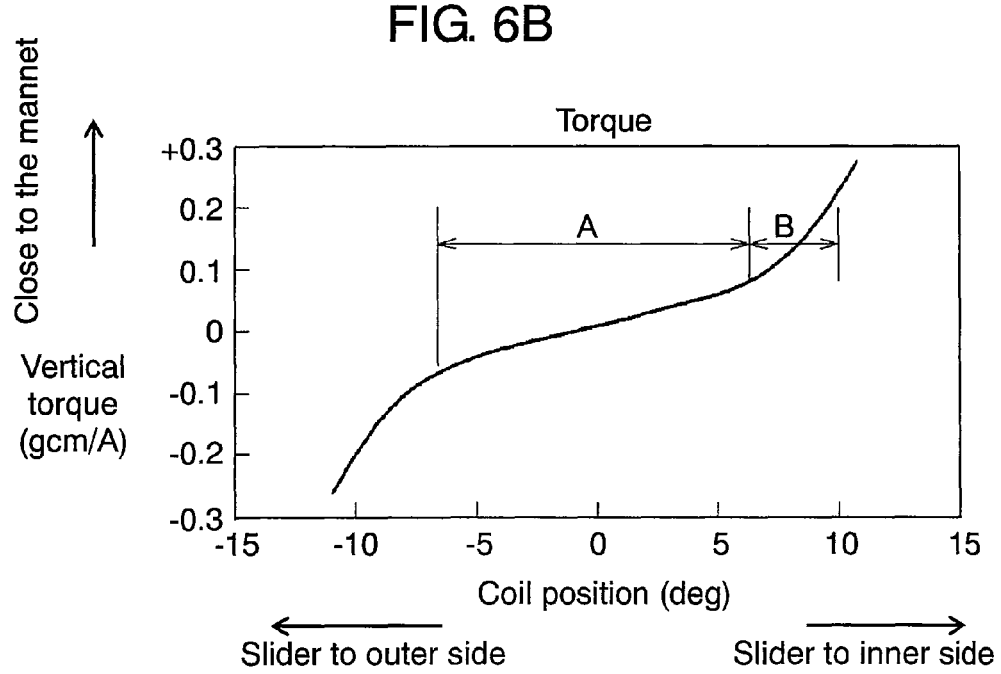

DISK DEVICE EMPLOYING A CSS SYSTEM HEAD SUPPORTING UNIT

THIS APPLICATION IS A U.S. NATIONAL PHASE APPLICATION OF PCT INTERNATIONAL APPLICATION PCT/JP2005/017113.

TECHNICAL FIELD

The present invention relates to disk drives employing flying heads such as a magnetic head, optical head, magneto-optic-head, more particularly, it relates to disk drives employing a CSS (contact-start-stop) system head supporting unit.

BACKGROUND ART

A magnetic disk drive is described hereinafter as an example of conventional disk drives. Recently the market of mobile information apparatuses such as PDAs (personal digital assistants), personal computers has been expanded, and those apparatuses have been downsized, so that magnetic disc drives, one of major data storage devices, are required to be highly portable, e.g. to be downsized and slimmed, and to have shock robustness. To meet these requirements, a magnetic disk drive employing disk-shaped magnetic recording media measuring as small as 0.85 inch (approx. 22 mm) across has been recently developed. (e.g. refer to "Development of 0.85 inch hard-disk drive mountable to mobile apparatus" by TOSHIBA Co., Ltd. Jan. 8, 2004, access to URL: http://www.toshiba.co.jp/about/press/2004_01/pr_j0801.htm. or access to URL: http://www.toshiba.co.jp/about/press/2004_03/pr1601.htm.)

The head supporting unit of such magnetic disk drives for mobile application has been generally held by a load/unload method (hereinafter referred to simply as L/UL method).

FIG. 11 shows a perspective view schematically illustrating the structure of magnetic disk drive 100 that employs a conventional L/UL method. When disk drive 100 shown in FIG. 11 is at rest, head supporting unit 108 rotates on bearing 105, so that slider 101 placed at the tip of unit 108 moves to the outer side of magnetic recording medium 107. Magnetic head holder 110 is provided to the outer side of medium 107, and slider 101 supported by suspension 102 runs up to be held onto the ramp of holder 110. This mechanism allows preventing slider 101 from colliding with magnetic recording medium 107 even if an impact applied to the disk drive 100.

When the disk drive starts operating, i.e. when magnetic recording medium 107 starts spinning, head supporting unit 108 rotates on bearing 105 in reversal direction to the foregoing case, so that slider 101 is loaded onto medium 107. At this time, slider 101 possibly touches medium 107, so that disk drive 100 employing the L/UL method needs evacuation area "O" at the outer rim of medium 107 for parking slider 101. This evacuation area "O" cannot be recorded magnetic data, so that the presence of evacuation area "O", which must be prepared at the outer rim, becomes a hurdle to the request of increasing the storage capacity as much as possible.

On the other hand, the CSS system needs no such an evacuation area at an outer rim of a recording medium. FIG. 12 shows a structure of magnetic disk drive 120 employing a conventional CSS system. Magnetic recording medium 107 under the CSS system has area "A" where magnetic data can be recorded and area "B" is an evacuation area (hereinafter referred to as a CSS area) where slider 101 having a magnetic head is parked when disk drive 120 is at rest. When medium 107 stops spinning, slider 101 touches medium 107 at CSS area "B"; however, when data is recorded or reproduced, namely, spindle motor 109 starts rotating, the magnetic head provided to slider 101 flies from medium 107, and records or reproduces data in area "A". When medium 107 in disk drive 120 stops spinning, head supporting unit 108 firstly rotates with slider 101 flying, then slider 101 moves into CSS area "B". Then as the rpm of medium 107 lowers, the airflow between medium 107 and slider 101 decreases, so that the flying force for slider 101 is lowered, and consequently the magnetic head or slider 101 touches medium 107 and comes to rest.

CSS system magnetic disk drive 120 needs an evacuation area as well, i.e. the foregoing CSS area "B" where the magnetic head or slider 101 is parked and no data is recorded as evacuation area "O" of the L/UL method cannot be recorded data. However, the CSS system is to form CSS area "B" at an inner circumferential side of medium 107, so that the ratio of CSS area "B" vs. total area of medium 107 can be smaller than the ratio of evacuation area "O" of L/UL method vs. total area of medium 107. In other words, when both of the CSS system and L/UL method use magnetic recording media 107 having the same storage capacity, the CSS system can use a greater storage area than the L/UL method.

In the foregoing conventional CSS system magnetic disk drive, the slider or the magnetic head touches the magnetic recording medium when the disk drive is at rest. Thus whenever the disk drive starts or stops operating, the spindle motor rotates with the slider or the magnetic head rubbing against the recording medium. This mechanism possibly incurs magnetic or mechanical damages to the slider, magnetic head, and magnetic recording medium. Thus the CSS system magnetic disk drive has been said that it is inferior to the L/UL system disk drive in durability, and is not fit for a mobile application.

DISCLOSURE OF INVENTION

The present invention addresses the foregoing problems, and aims to provide a CSS system disk drive excellent in durability. To solve the foregoing problems, the disk drive of the present invention comprises the following elements:
- a recording medium rotatably supported;
- a rotary section for spinning the recording medium;
- a slider having a head;
- a supporting arm having the slider at a first end face confronting the recording medium;
- a bearing for holding the supporting arm rotatably along a recording surface of the medium and pivotably in a vertical direction with respect to the recording surface;
- an elastic section for thrusting the first end of the supporting arm toward the recording medium; and
- a driver for rotating the supporting arm along the recording surface of the medium.

The driver rotates the supporting arm along the recording surface of the recording medium, and stops the head at a predetermined evacuation area on the recording surface. At this moment, a second end of the supporting arm is pressed, thereby reducing the thrusting force applied to the first end of the arm by the elastic section.

The structure discussed above allows lowering the possibility of mechanically damaging the slider, head, and recording medium when the rotary section starts spinning from its rest status, because the driver presses the second end of the supporting arm so that the thrusting force applied by the elastic section to the first end, where the head is placed, of the arm can be reduced when the head comes to rest at the predetermined evacuation area. As a result, a CSS system disk drive excellent in durability is obtainable.

The driver can be structured this way: The driver includes a coil placed at the second end of the supporting arm and a magnet for applying magnetic field to the coil. Electric current running through the coil and the magnetic field generated by the magnet produces Lorentz force, with which the second end of the supporting arm is pressed. The foregoing structure allows quick driving by using a voice coil motor as the driver, and also applying Lorentz force, produced by both of the electric current running though the coil and the magnetic field generated by the magnet, to the coil, thereby depressing the second end of the supporting arm.

The driver can be formed this way: while the head is parked at the predetermined evacuation area on the recording surface of the medium, the magnet has a greater width at its side, where an end of the coil is placed, than its center width. This structure allows applying the greater Lorentz force to the second end, where the coil is placed, of the supporting arm while the head is parked at the predetermined evacuation area on the recording surface of the medium.

The driver also can be formed this way: while the head is parked at the predetermined evacuation area on the recording surface of the medium, the coil is placed such that the end of the coil is placed outside the end of the magnet. This structure allows utilizing leakage magnetic field from the magnet for applying further greater Lorentz force to the second end of the supporting arm.

The disk drive can further include a limiter for limiting the rotating action of the supporting arm along the recording surface of the medium while the head of the supporting arm is parked at the predetermined evacuation area on the recording surface of the medium. This structure allows limiting the action of the supporting arm while the head is parked at the predetermined evacuation area on the recording surface of the medium, so that the structure excellent in shock resistance is obtainable.

The limiter can include a magnet, and a part of the supporting arm is formed of magnetic material, which part contacts the limiter. The limiter limits the rotating action of the arm by using the magnetic force of the magnet. This structure allows limiting the rotating action of the arm with such a simple structure as employing the magnet.

The limiter can include a solenoid wound on the magnet, and releases the limit imposed on the rotating action of the supporting arm by using the magnetic force generated by the electric current applied to the solenoid. This structure allows limiting and releasing the rotating action of the supporting arm with such a simple structure as employing the magnet and the solenoid.

The limiter can be formed of a one-way clutch provided to the bearing. This structure allows limiting the rotating action mechanically, and achieving a structure excellent in shock resistance during a non-operating status.

The driver can be formed of a structure which reduces the force equivalent to or smaller than the thrusting force supplied by the elastic section to the supporting arm. This structure allows achieving the structure which generates little friction between the recording medium and the slider or the head provided to the first end of the supporting arm when the rotary section starts spinning, so that the structure can be excellent in durability.

The elastic section is formed of a leaf spring provided between the bearing and the supporting arm. This structure allows forming a thinner elastic section easier to manufacture.

The supporting arm can include a gimbal mechanism which supports the slider both in a rolling direction and a pitching direction. This structure allows absorbing a slant both in the rolling direction and the pitching direction. The slant is produced by undulation of the recording medium with respect to the slider during the operation of the disk drive.

The disk drive can include a pivot bearing between the bearing and the supporting arm, and the pivot bearing has a pair of apexes which act as a fulcrum for the supporting arm to pivot vertically with respect to the recording surface. This simple structure allows accurately setting the pivot center of the supporting arm pivoting vertically with respect to the recording surface, so that the head positioning can be accurately controlled.

The pair of apexes discussed above can be placed on the line vertical with respect to the axial direction of the bearing and the longitudinal direction of the supporting arm as well, and which line extends through the rotary center of the bearing when the bearing rotates along the radius direction of the recording medium. This structure allows achieving the supporting arm well-balanced in terms of weight in the longitudinal direction.

The pair of apexes of the pivot bearing discussed above can be placed symmetrically with respect to the longitudinal centerline of the supporting arm. This structure allows achieving the supporting arm further well-balanced in terms of weight.

The center of gravity of the part of the supporting arm, which part is held by the elastic section, can be positioned on the axial line of the rotation center of the supporting arm, which pivots vertically with respect to the recording surface of the recording medium. This structure allows minimizing vibration of the supporting arm when an external shock is applied to the disk drive.

The bearing can be formed of an inner ring, balls, an outer ring, and a flange that covers the inner ring, the balls, and the outer ring. The flange is attracted by magnetic force of the magnet for being held. This structure allows attracting and holding the flange by the magnetic force of the magnet, so that the number of steps of the ball bearings can be reduced. As a result, the disk drive can be slimmed.

The present invention thus can provide a CSS system disk drive excellent in durability.

BRIEF DESCRIPTION OF THE DRAWINGS

FIG. 6A shows a relation between horizontal torque (marked on Y axis) per electric current applied to a supporting arm end, where a coil is placed, and a rotating angle (marked on X axis) of the supporting arm of a magnetic disk drive in accordance with an embodiment of the present invention.

FIG. 6B shows a relation between vertical torque (marked on Y axis) per electric current applied to a supporting arm end, where a coil is placed, and a rotating angle (marked on X axis) of the supporting arm of a magnetic disk drive in accordance with an embodiment of the present invention.

DESCRIPTION OF PREFERRED EMBODIMENT

An exemplary embodiment of the present invention is demonstrated hereinafter with reference to the accompanying drawings.

Exemplary Embodiment

Figure 1:
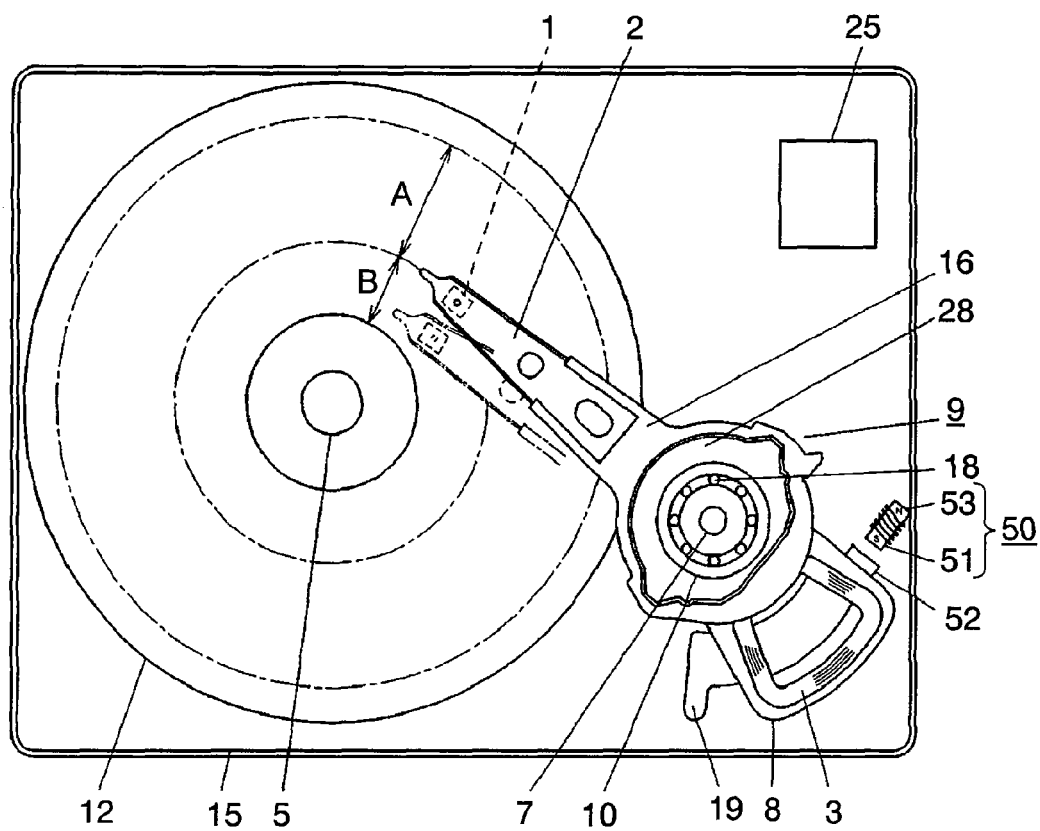
FIG. 1 shows a plan view illustrating a structure of a magnetic disk drive in accordance with an embodiment of the present invention.
Figure 2:
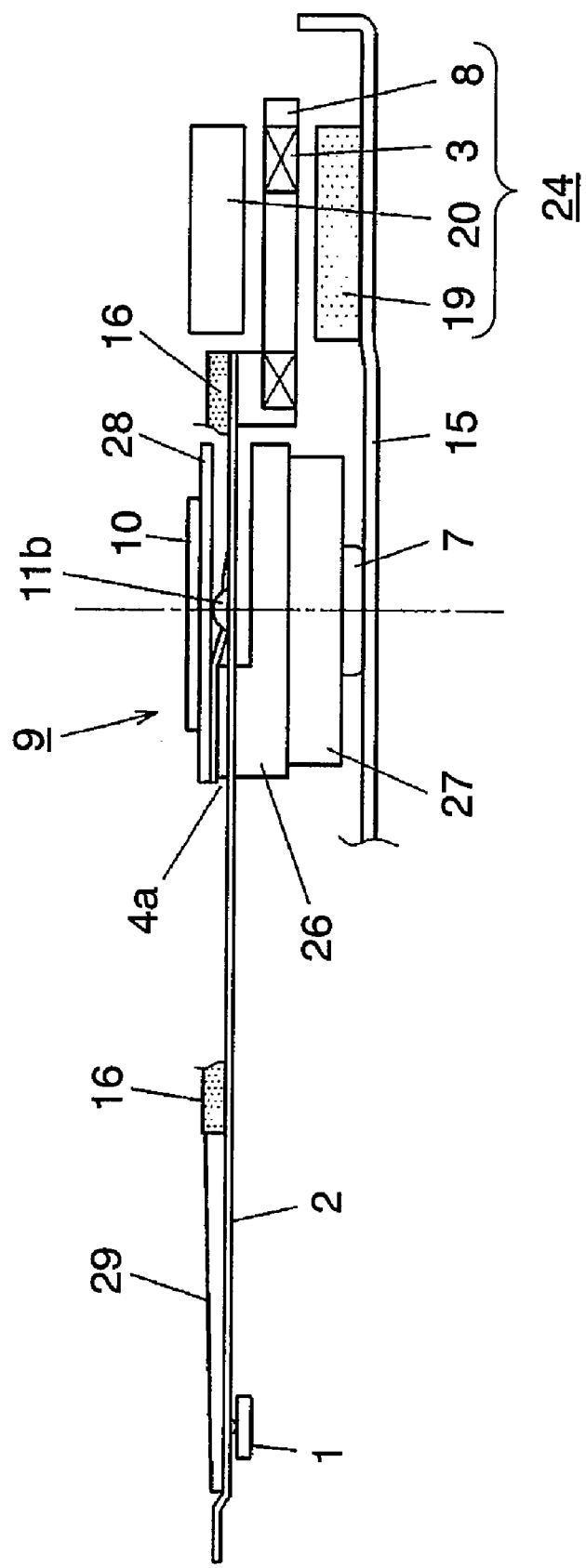
FIG. 2 shows a lateral view of a head supporting unit of a magnetic disk drive in accordance with an embodiment of the present invention.

A magnetic disk drive is taken as an example for describing a structure of a disk drive in accordance with this embodiment of the present invention. FIG. 1 shows a plan view of magnetic disk drive 23 in accordance with the embodiment of the present invention. FIG. 2 shows a lateral view illustrating head supporting unit 9 of disk drive 23.

First, the structures of magnetic disk drive 23 and head supporting unit 9 are described hereinafter. FIG. 1 and FIG. 2 show that slider 1 is positioned at the inner most circumference of active area "A" (recordable area) of magnetic recording medium 12 while magnetic disk drive 23 is in operation, i.e. medium 12 spins. In FIG. 1 the alternate long and short dash line indicates the status of disk drive 23 being at rest.

Magnetic disk drive 23 of the present invention comprises the following elements:
 disk-shaped recording medium 12;
 spindle motor 5 for spinning recording medium 12;
 head supporting unit 9 rotatable along a recording surface of medium 12 and pivotable vertically with respect to the recording surface, this mechanism is detailed later; and
 keep solenoid 50 acting as a limiter for limiting the rotating action of head supporting unit 9 along the recording surface.

Disk drive 23 employs the CSS system previously discussed, and while disk drive 23 is at rest, slider 1 placed at a first end of supporting arm 2 of head supporting unit 9 touches medium 12 at CSS area "B" as shown with the alternate long and short dash line.

Magnetic recording medium 12 is formed of a disk-shaped glass substrate having 0.381 mm thickness, and the surface of the glass is coated with a magnetic recording layer, and the disk has 10.8 mm radius. Active area (recordable area) "A" is available from the radius of 10.1 mm to the inside, and CSS area "B" is formed from the radius of 5.5 mm to the inside. The capacity of active area "A" of medium 12 amounts to approx. 2 G bytes.

Figure 3:
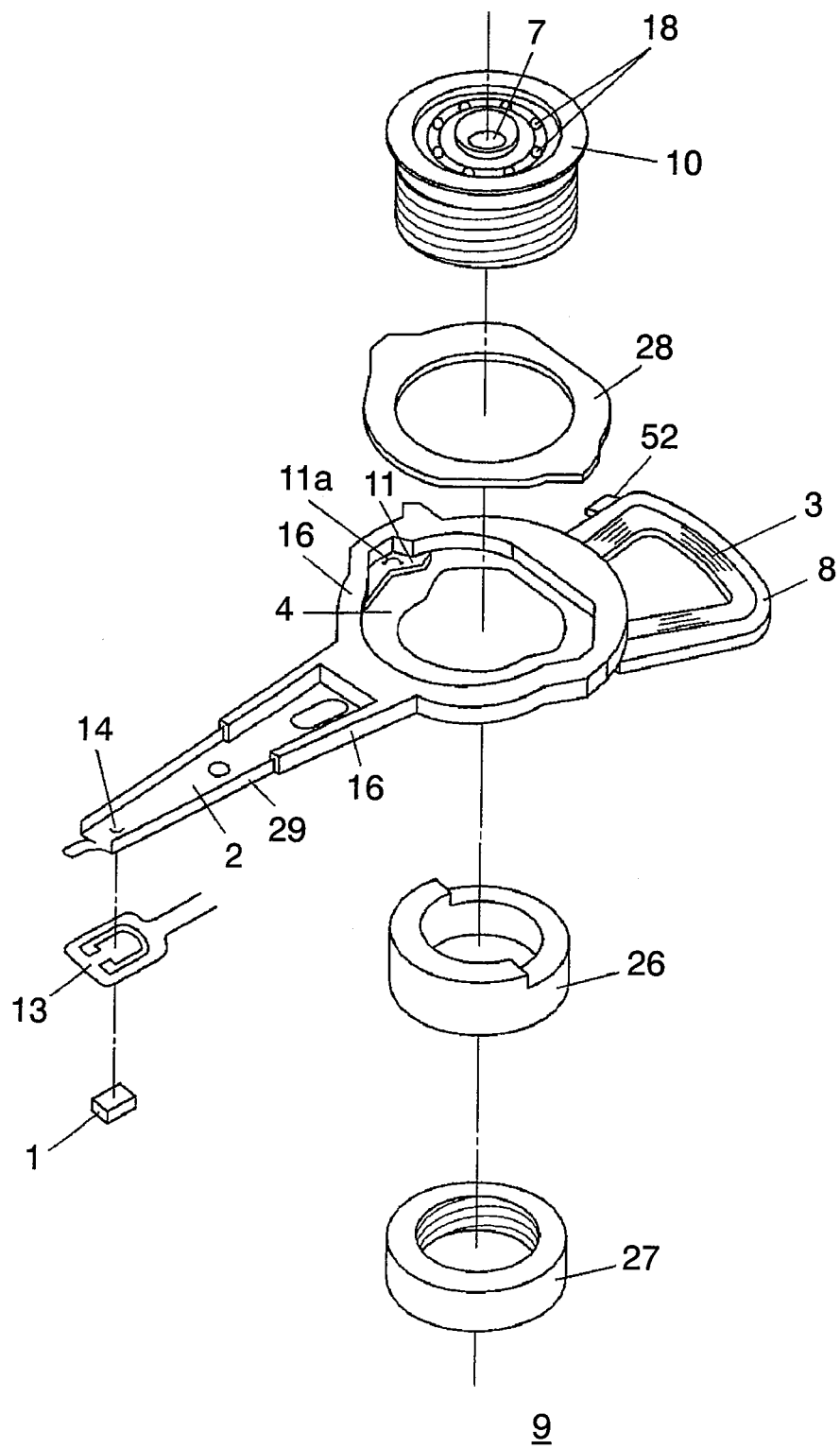
FIG. 3 shows a perspective exploded view illustrating a structure of a head supporting unit of a magnetic disk drive in accordance with an embodiment of the present invention.

As shown in FIGS. 1 and 2, disk drive 23 includes head supporting unit 9 which has supporting arm 2 formed of a single material. The structure of head supporting unit 9 is detailed hereinafter. FIG. 3 shows a perspective exploded view of head supporting unit 9, and FIG. 4 shows a plan view illustrating supporting arm 2 of head supporting unit 9 in accordance with this embodiment.

Figure 4:
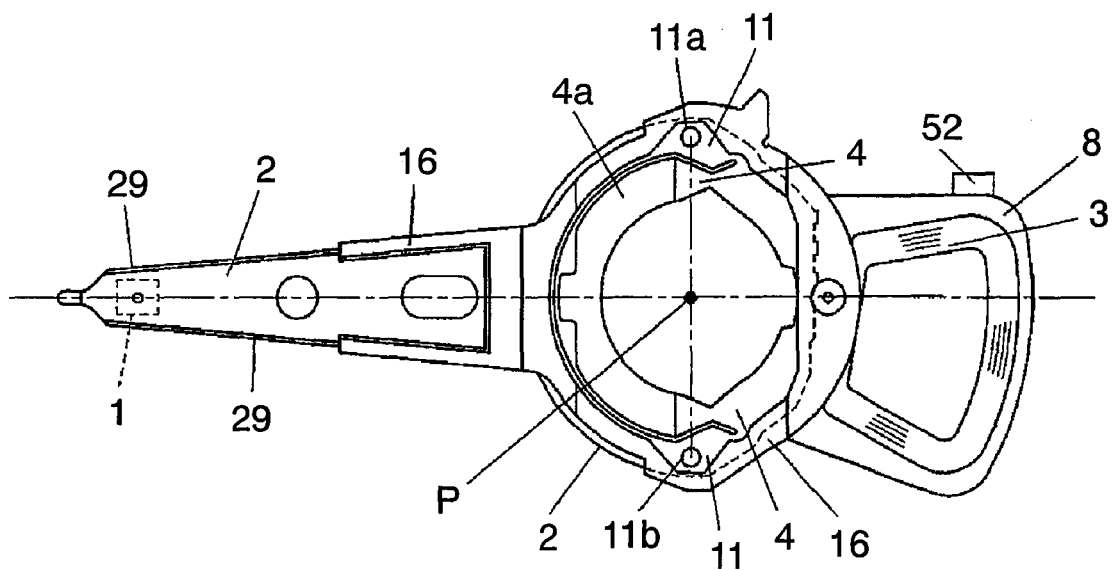
FIG. 4 shows a plan view of a supporting arm of a head supporting unit in accordance with an embodiment of the present invention.

In FIGS. 3 and 4, supporting arm 2 of head supporting unit 9 is punched a hole circularly at its center for preparing holder 4a on the first end (left side on FIG. 4, i.e. the side on which slider 1 is placed) of arm 2. Holder 4a is formed semi-annular shape by cutting the first side semi-circularly. As shown in FIG. 2 or 3, head supporting unit 9 is structured this way: semi-annular holder 4a and annular spring fixing member 28 are tightly held together on the first end with respect to the rotary shaft, and leaf spring 4 and supporting arm 2 are coupled together on the second end (right side of the drawing). Supporting arm 2 is coupled to coil holder 8, to which coil 3 is mounted, at its second end so that supporting arm 2 can rotate along the recording surface of medium 12 by the operation of the voice coil motor described later. Those elements together with collar 26 are held together tightly by screwing bearing 10 into nut 27.

Supporting arm 2 includes pivot bearing 11 having a pair of apexes 11a and 11b as shown in FIGS. 2, 3 and 4. Supporting arm 2 is sandwiched by spring fixing member 28 and collar 26, so that it is held elastically with respect to bearing 10 via leaf spring 4, and the pair of apexes 11a, 11b are brought into contact with spring fixing member 28. Supporting arm 2 can thus pivot vertically with respect to recording medium 12 on apexes 11a, 11b as fulcrum.

The pair of apexes 11a, 11b formed on pivot bearing 11 are placed vertically with respect to the center axis of rotating along the recording surface of medium 12 and the longitudinal direction of supporting arm 2 as well, and they are brought into contact with spring fixing member 28 at the symmetrical points with respect to the center line of supporting arm 2 on the line which extends through the rotary center of the bearing.

As shown in FIGS. 2 and 3, supporting arm 2 has slider 1 which includes a magnetic head (not shown) at its first end facing recording medium 12. Since disk drive 23 of the present invention employs the CSS system, during medium 12 at rest, slider 1 parks at CSS area "B" as shown in FIG. 1 with the alternate long and short dash line while slider 1 touches medium 12. Disk drive 23 includes keep-solenoid 50 which magnetically holds coil holder 8 while slider 1 parks at CSS area "B" and medium 12 is at rest. Keep-solenoid 50 is a solenoid formed of stick-like magnet 53 wound by coil 51, and holds coil holder 58 with the magnetic force of magnet 53 at magnetic part 52 of coil holder 58. Keep-solenoid 50 also runs an electric current through coil 51 to generate magnetic field, which then cancels off the magnetic force of magnet 53, so that coil holder 8 can be released from its being held at magnetic part 52 by magnet 53. The presence of keep-solenoid 50 allows disk drive 53 to hold supporting arm 2 free from moving while disk drive 23 is at rest, so that a structure excellent in shock resistance is achievable.

Coil 3 mounted to coil holder 8, which is coupled to the second end of supporting arm 2, upper yoke 20 (not shown in FIG. 1) provided to chassis 15 of disk drive 23, and magnet 19 together form voice coil motor (VCM) 24, i.e. the driver. VCM 24 allows supporting arm 2 to rotate along the radius direction of medium 12 on bearing 10 as a center. Bearing 10 is mounted to chassis 15 rotatably by screw 7 via ball bearing 18.

Magnetic recording medium 12 is rotatably supported by spindle motor 5, and while disk drive 23 records or reproduces data, the magnetic head mounted to slider 1 floats over medium 12 with a given clearance in between for recording or reproducing the data. To be more specific, when slider 1 having the magnetic head is loaded in recordable area "A" of medium 12, spinning of medium 12 by spindle motor 5, i.e. rotary section, produces airflow, thereby generating flying force, and leaf spring 4 of head supporting unit 9 thrusts slider 1 toward medium 12. This thrusting force and the flying force allows the magnetic head to fly over medium 12.

In this case, a given load is applied to slider 1 for approaching medium 12 by leaf spring 4, i.e. elastic section provided to head supporting unit 9. This given load is adjustable by selecting the width, or the material of leaf spring 4.

As shown in FIGS. 2 and 3, disk drive 23 employs gimbal mechanism 13 which uses a gimbal spring, and gimbal mechanism 13 supports slider 1 via projection 14 such that slider 1 can slant in both of a rolling direction and a pitching direction. This structure allows gimbal mechanism 13 to absorb unnecessary slants in the rolling direction and the pitching direction of slider 1 with respect to medium 12 during the recording or reproducing operation of disk drive 23. The unnecessary slants are caused by undulation of medium 12.

Rotating, halting of medium 12, pivoting of supporting arm 2 along the recording surface of medium 12, and applying an electric current to coil 51 of keep-solenoid 50 are respectively controlled by controller 25 shown in FIG. 1, although the respective wirings to controller 25 are not shown.

Each one of the structural elements used in this embodiment is detailed hereinafter. Supporting arm 2 is unitarily formed of metal. For instance, it can employ stainless steel of 40 μm thick (SUS304). An etching method or a press working method can be used for forming supporting arm 2. Use of such supporting arm 2 allows heightening its resonance frequency from conventional one, e.g. approx. 2 kHz, to as high as approx. 10 kHz, so that a magnetic disk drive having a greater rpm and a greater access speed of the head supporting unit than those of the conventional one is obtainable. Supporting arm 2 includes bent section 29 at its tip for improving the mechanical strength.

As shown in FIGS. 3 and 4, supporting arm 2 of disk drive 23 is unitarily molded with resin 16 in order to achieve higher rigidity, and for instance, an out-sert molding method is used. This method inserts supporting arm 2 into a mold, then pours resin 16 into the mold for molding.

Holder 4a and leaf spring 4 are formed by punching out a part of supporting arm 2 semi-circularly as previously discussed. This is done by an etching method or a press working method. Annular leaf spring 4 and holder 4a can be separately formed of stainless steel (SUS304) by the press working or etching, and then they can be coupled to the second end of supporting arm 2 by a known method such as welding.

Coil holder 8 can be made of metal, e.g. aluminum, or resin, e.g. poly phenylene sulfide (PPS), or liquid crystal polymer (LCP); however, at least magnetic section 52 that is to be held by keep-solenoid 50 is preferably formed of soft magnetic material such as SECC. In the case of employing aluminum, coil holder 8 is formed by die-casting or press working, and in the case of PPS or LCP, a known resin-molding method can be used. Coil holder 8 as a whole can be formed of soft magnetic material such as SECC.

Upper yoke 20 can be made of soft magnetic material such as SECC, and formed by press working.

Figure 5A:
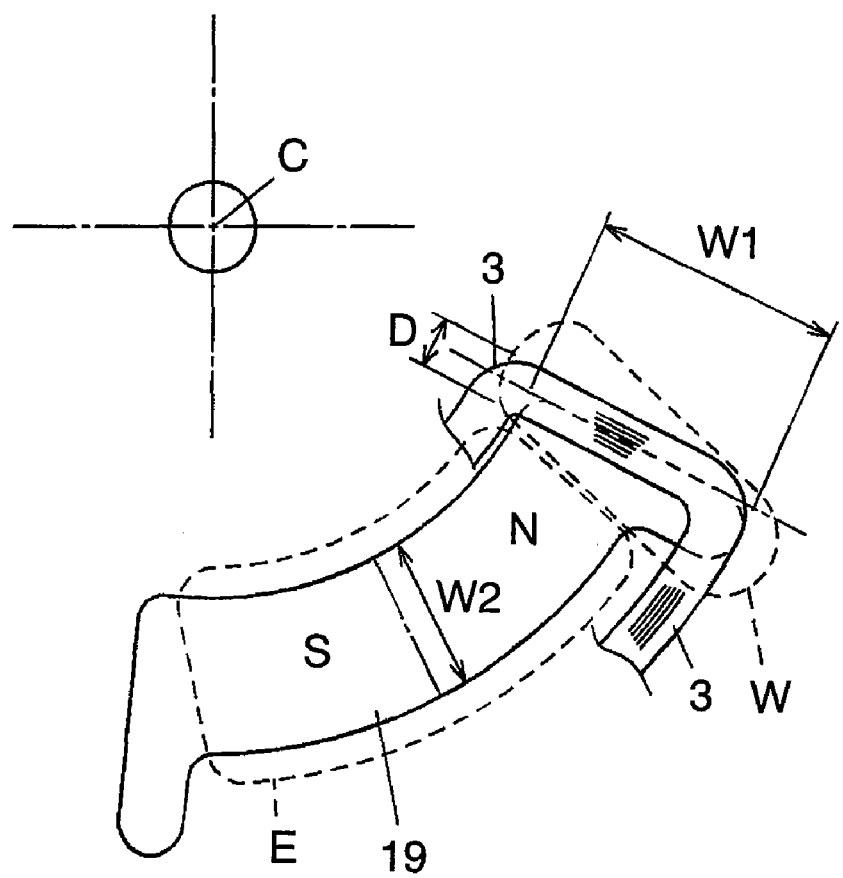
FIG. 5A shows a plan view illustrating a positional relation between a magnet and a coil of a magnetic disk drive in accordance with an embodiment of the present invention.
Figure 5B:
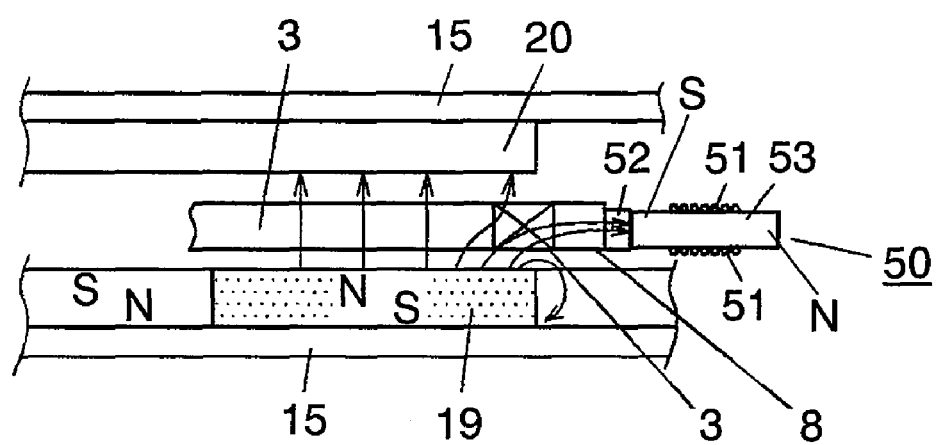
FIG. 5B shows a positional relation in height between a magnet and a coil of a magnetic disk drive in accordance with an embodiment of the present invention, it also shows magnetic field generated by the magnet.

Magnet 19 can be made of neodymium-iron-boron-based rare earth magnet, or other materials such as Alnico, ferrite, neodymium, or samarium-cobalt, and formed by forging, firing, or injection molding. Magnet 19 of disk drive 23 has a wider width at its both ends than at its center as shown in FIG. 5A. The reason of this wider width is described hereinafter. FIGS. 5A-5B describe the relations between magnet 19 and coil 3. FIG. 5A shows a plan view of the positional relation thereof, and FIG. 5B shows the positional relation in height and shows the magnetic field generated from magnet 19 as well. Both of FIGS. 5A and 5B show the status where slider 1 is parked at the inner most circumference of recording medium 12 (in this embodiment, the position is 4.3 mm away in radius from the center).

First, as shown in FIG. 5A, magnet 19 has width "W1" at end area "W" on the right side of the drawing (in other words, when slider 1 is parked at the inner most circumference, width "W1" is across the side of magnet 19 with which the end of coil 3 overlaps). Width "W1" is formed to be greater than width "W2" of center "E" of magnet 19. In the case of slider 1 parking at the inner most circumference of medium 12, this structure allows coil 3 overlaps with wider-width area "W" of magnet 19, so that the magnetic field generated from N-pole of magnet 19 travels directly toward upper yoke 20 at the center of magnet 19; however, the magnetic field in part travels toward S-pole of keep-solenoid 50, as shown in FIG. 5B, around the periphery of magnet 19. In other words, at the end of magnet 19, outward magnetic field in horizontal direction (i.e. leakage magnetic field) occurs. This leakage magnetic field in the horizontal direction is applied to coil 3 as well.

In coil 3, an electric current runs in a given direction (in FIG. 5, the direction vertical with respect to the drawing sheet), so that downward Lorentz force is applied to coil 3 due to the leakage magnetic field from magnet 19. Thus coil 3 is thrusted along the downward direction in FIG. 5B, i.e. the direction leaving upper yoke 20. Since supporting arm 2 can rotate vertically with respect to the recording surface of medium 12 on the pair of apexes 11a and 11b acting as fulcrum, when coil 3 is thrusted toward the direction leaving upper yoke 20, it eventually works the first end of supporting arm 2, where slider 1 is mounted, to leave medium 12.

FIGS. 6A-6B show a relation between torque (marked on Y axis) per electric current applied to a second end of supporting arm 2, where a coil 3 is placed, and a rotating angle (when a tip of arm 2 is positioned at the center of active (recordable) area "A" of medium 12, the rotating angle is 0°, i.e. zero degree) of supporting arm 2 is marked on X axis.

FIG. 6A shows horizontal torque while FIG. 6B shows vertical torque. The respective drawings show that as a value on X-axis gets greater, slider 1 moves more inward of medium 12, in other words, coil 3 moves more outward. FIG. 6B shows active area "A" and CSS area "B".

As shown in FIG. 6A, the torque per unit electric current applied to coil 3 horizontally stays approx. constant in horizontal direction regardless of the rotating angle of supporting arm 2; however, as shown in FIG. 6B, the torque per unit electric current applied to coil 3 vertically changes greatly at both the ends of rotating angles of supporting arm 2 although the vertical torque does not change so much at the center of the rotating angles. In these greatly changing areas, coil 3 is energized up and down, namely, when coil 3 is positioned at the outer circumferential side (i.e. slider 1 is positioned at inner circumferential side of medium 12), downward force is applied to coil 3 (the force making coil 3 leave upper yoke 20). On the contrary, when coil 3 is positioned at the inner circumferential side (i.e. slider 1 is positioned at the outer circumferential side of medium 12), upward force is applied to coil 3. The magnitude of vertical torque is adjustable by changing the width of both the ends of magnet 19. As the width of both the ends of magnet 19 becomes wider, a greater area is influenced by the magnetic field of magnet 19, so that proportionately greater vertical torque can be generated.

The maximum torque can be obtained from the following structure described in the plan view as shown in FIG. 5A: The ultimate end area "W" of magnet 19, which area "W" has greater width "W1" (this ultimate end is shown at the right end of FIG. 5A) generally agrees with the center line of width "D" of the end of coil 3 (the end of coil 3 is shown at the right side of FIG. 5A). On the contrary, when slider 1 is positioned at the outer most circumference of medium 12, this vertical torque should be suppressed as much as possible in order to read or write a signal in a stable manner.

Figure 7A:
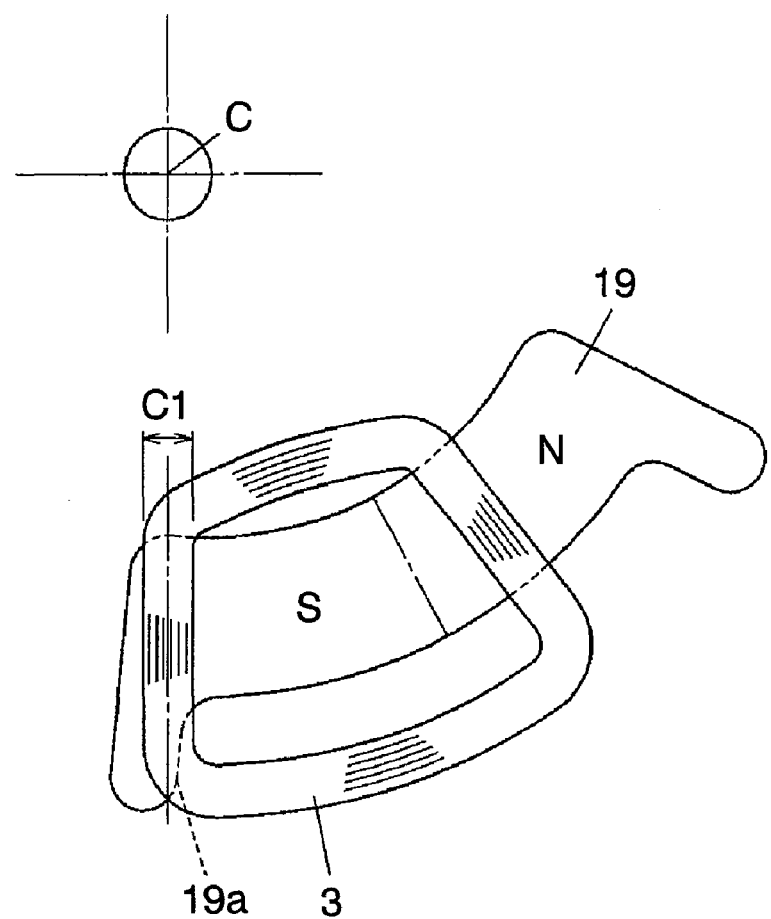
FIG. 7A shows a plan view illustrating a positional relation between a magnet and a coil of a magnetic disk drive in accordance with an embodiment of the present invention when a slider held by a supporting arm is positioned at an outer most rim.
Figure 7B:
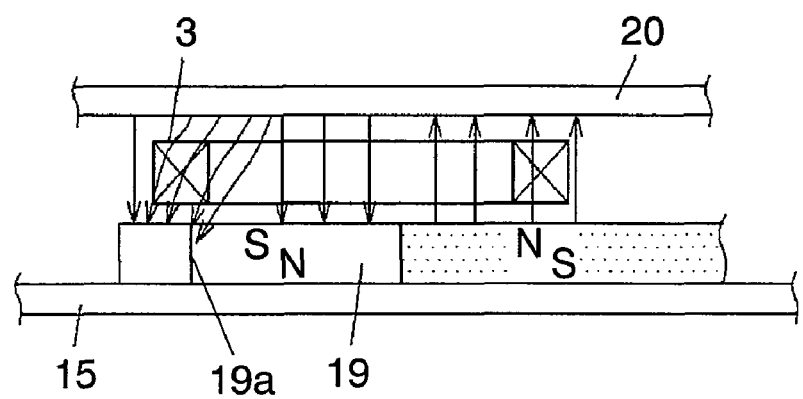
FIG. 7B shows a relation in height between a magnet and a coil of a magnetic disk drive in accordance with an embodiment of the present invention when a slider held by a supporting arm is positioned at an outer most rim, and it also shows magnetic field generated by the magnet.

It is thus desirable to place magnet 19 and coil 3 in the positional relation as shown in FIG. 7A-7B when slider 1 is positioned at the outer most circumference of medium 12. FIG. 7 shows a positional relation between magnet 19 and coil 3 when slider 1 is positioned at the outer most circumference. FIG. 7A shows this relation in a plan view, and FIG. 7B shows this relation in height and the magnetic field generated by magnet 19. Both of FIGS. 7A and 7B show the positional relation when slider 1 is positioned at the outer most circumference of medium 1, to be more specific in this embodiment, approx. 10.1 mm away in radius direction from the center.

As shown in FIG. 7A, when slider 1 (not shown) is positioned at the outer most circumference of medium 12, it is desirable that inner end 19a at the inner rim of magnet 19 generally agree with the centerline of width "C" of coil 3. This structure allows the magnetic field travels from upper yoke 20 toward S-pole of end 19a of magnet 19 to slant in the area where coil 3 exists, and the Lorentz force produced by this magnetic field can suppress the vertical force generated in coil 3, so that the vertical torque is hard to occur. Use of head supporting unit 9 in such an area, where the vertical torque occurs in the outer circumferential side but not in the inner circumferential side, allows coil 3 to generate the vertical torque only when coil 3 is away from magnetic medium 12. In other words, only when slider 1 is placed at the inner most circumference, coil 3 can generate the vertical torque.

The foregoing positional relation between magnet 19 and coil 3 allows weakening the downward thrusting force (in the direction of approaching medium 12) applied to slider 1 by leaf spring 4 due to the following mechanism: at the outer circumferential side of coil 3, the leakage magnetic field traveling from magnet 19 toward keep-solenoid 50 and the electric current applied to coil 3 generate Lorentz force, which works against the thrusting force when slider 1 having the magnetic head enters into CSS area "B". As a result, in CSS area "B", the problem of adsorption between slider 1 and magnetic medium 12 is hard to occur, and the problem of abrasion between medium 12 and slider 1 or the magnetic head is hard to occur as well. The disk drive excellent in durability is thus obtainable.

The structure of disk drive 23 in accordance with this embodiment needs lower torque than the conventional one for spindle motor 5 to start operating disk drive 23, so that this structure with the lower torque allows saving electric power and downsizing spindle motor 5. The structure also allows lowering the possibility of damaging magnetic recording medium 12 by the abrasion between slider 1 and medium 12 at the starting or halting of spindle motor 5, and medium 12 thus suffers from few damages, so that a longer service life of medium 12 can be expected. The foregoing structure of disk drive 23 proves that the service life thereof can be extended as long as approx. 10 times comparing with the service life of the conventional CSS system disk drive.

In this embodiment, disk drive 23 includes keep-solenoid 50, however; disk drive 23 does not necessarily include keep-solenoid 50. Indeed the structure including keep-solenoid 50 is better fit for practical use because magnet 19 tends to generate the leakage magnetic field depending on the direction of magnet 53, but a structure excluding keep-solenoid 50 allows generating the leakage magnetic field as well from magnet 19 in the horizontal direction as shown in FIG. 5B, so that the use of this leakage magnetic field allows coil 3 to generate vertical torque.

Respective elements of disk drive 23 in accordance with this embodiment can be coupled to each other by a known coupling method such as spot welding, ultrasonic welding, laser welding and so on. Disk drive 23 is not limited by the methods of manufacturing the respective elements or the methods of coupling the respective elements to each other.

The foregoing structure of head supporting unit 9 of disk drive 23 allows forming supporting arm 2 of highly rigid material, so that the whole area including from bearing 10 of head supporting unit 9 to spring fixing member 28, and from apexes 11a, 11b of pivot bearing 11 to the area where slider 1 is formed on supporting arm 2 can be formed with high rigidity.

Use of highly rigid material to supporting arm 2 not only improves the shock resistance against an external shock but also raises the resonance frequency of supporting arm 2, so that a conventional problem of vibration mode does not occur anymore, which needs no settling action. As a result, supporting arm 2 can be moved and positioned at a higher speed, so that the access speed of disk drive 23 can be improved.

Change of the thickness or the material of leaf spring 4, i.e. elastic section, allows selecting the strength or the spring constant of leaf spring 4.

Design of head supporting unit 9 in the following manner will achieve a stable head supporting unit which vibrates little in response to an external shock: the center of gravity of a section of head supporting unit 9, which section is held by leaf spring 4, to be more specific, when supporting unit 9 is rotated by VCM 24, the center of gravity pf supporting arm 2 which holds coil 3 and coil holder 8 becomes the same point as the intersection point between the rotating axis of arm 2 along the recording surface of medium 12 and the pivoting axis vertical with respect to the recording surface of medium 12. In other words, the foregoing center of gravity becomes substantially the same point as the middle point (point "P" shown in FIG. 4) between the two points where supporting arm 2 is brought into contact with apexes 11a and 11b of pivot bearing 11. This design allows providing the head supporting unit having the greater shock resistance, and some differences such as errors in manufacturing of the head supporting units do not affect the practical use.

Next, means for evacuating the magnetic head of disk drive 23 from the active area and the evacuating operation are demonstrated hereinafter. As shown in FIG. 1 and FIG. 2, CSS area "B" is prepared as an evacuation area at a given area on the inner rim of recording medium 12 for parking or evacuating slider 1 placed at the first end of supporting arm 2.

CSS area "B" has a surface formed more coarsely than that of active area "A" magnetically recordable so that adsorption between medium 12 and slider 1 or the magnetic head hardly occurs. When medium 12 stops spinning, the first side, where slider 1 is placed, of supporting arm 2 rotates toward the inner circumferential side of medium 12 due to the operation of VCM 24. Lowering the rpm of medium 12 weakens the airflow, so that the flying force decreases, and slider 1 eventually touches medium 12 in area "B" and stops there.

As shown in FIG. 2, in head supporting unit 9 of disk drive 23, coil 3 is sandwiched by magnet 19 and upper yoke 20. When the first end of supporting arm 2 exists at the inner circumferential side, coil 3 is thrusted to approach magnet 19. Because an electric current is applied to drive supporting arm 2 being in the status as shown in FIG. 5A to approach the further inner circumferential side. Thus the second end of supporting unit 9 is depressed downward, so that the thrusting force applied to the first end by leaf spring 4 is reduced.

The foregoing structure allows reducing the abrasion between medium 12 and slider 1 or the magnetic head when supporting arm 2 rotates toward the inner circumferential side of medium 12 along the radius direction for parking slider 1 in CSS area "B", because Lorentz force is generated due to the relation between the magnetic field from magnet 19 and the electric current running through coil 3, and this Lorentz force thrusts coil holder 8 along the direction leaving upper yoke 20, thereby reducing the abrasion. This mechanism can lower the load applied to spindle motor 5 in spinning magnetic medium 12 at the start of magnetic disk drive 23, and also prevent medium 12 from being damaged by slider 1 or the magnetic head. In addition to these advantages, when disk drive 23 is at rest, slider 1 is parked at area "B", namely it touches area "B", and the first end, where slider 1 is formed, of supporting arm 2 is energized in the direction leaving medium 12, so that the frictional force between medium 12 and slider 1 or the magnetic head is reduced. As a result, the adsorption between medium 12 and slider 1 or the magnetic head hardly occurs, thus necessary torque for spindle motor 5 to start operating can be drastically reduced comparing with the conventional disk drive. Spindle motor 5 therefore can work with smaller torque, so that in the case of downsizing disk drive 23 as a whole, the portion of spindle motor 5 can be downsized with necessary torque maintained. Consequently magnetic disk drive 23 as a whole can be downsized and slimmed as well.

Disk drive 23 in accordance with this embodiment has chassis 15 of which dimensions are identical with the outside dimensions of SD memory cards. To be more specific, the dimensions of chassis 15 shown in FIG. 1 or 2 are 32 mm in length, 24 mm in width and 2.1 mm in thickness. Since the thickness of 2.1 mm is achievable, it can be selected from 2.1 mm, 3 mm and so on depending on the request from users who mount disk drives 23 to their apparatuses.

An appropriate design of magnet 19 of disk drive 23 allows specifying the thrusting force generated in coil holder 8 by magnet 19 to be equal to or slightly smaller than the load applied to supporting arm 2 by leaf spring 4. Use of this design allows minimizing the sliding load between medium 12 and slider 1 or the magnetic head, so that the starting load of spindle motor 5 can be further reduced, and thus disk drive 23 can be downsized and slimmed in more effective manner.

In addition to the foregoing advantage, a design of magnet 19 allows specifying the thrusting force generated in coil holder 8 to be greater than the load applied to supporting arm 2 by leaf spring 4. Use of this design allows holding slider 1 being disengaged from magnetic recording medium 12.

In this embodiment, pivot bearing 11 is described to include a pair of apexes 11a, 11b protruding upwardly on supporting arm 2; however, the present invention is not limited to this structure, for instance, pivot bearing 11 can have a pair of apexes protruding downward on spring fixing member 28.

In this embodiment, supporting arm 2 includes pivot bearing 11 which is described to have the pair of apexes 11a, 11b as shown in FIGS. 2, 3 and 4; however, the disk drive of the present invention is not limited to the shape of these apexes 11a, 11b. For instance, pivot bearing 11 has apexes in any other forms such as a wedge-like projection or U-shape as long as they can act as fulcrum when supporting arm 2 pivots vertically with respect to the recording surface of medium 12.

Figure 8A:
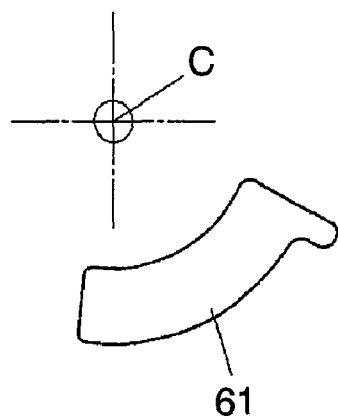
FIG. 8A shows another magnet of a magnetic disk drive in accordance with an embodiment of the present invention. This another magnet has a wider width at the end of outer circumferential side (right-hand on the drawing).
Figure 8B:
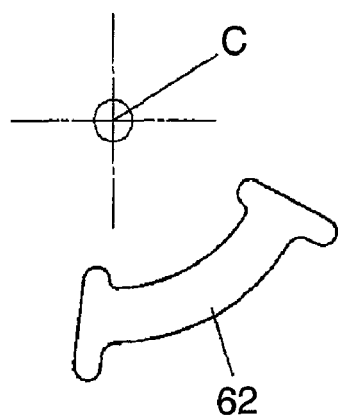
FIG. 8B shows still another magnet of a magnetic disk drive in accordance with an embodiment of the present invention. This still another magnet has wider widths at its both ends.
Figure 8C:
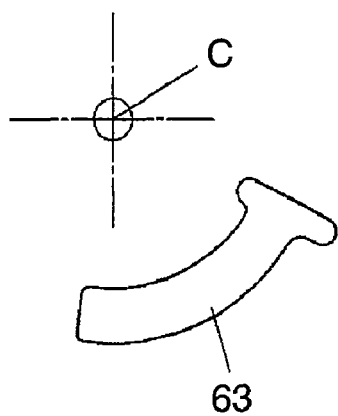
FIG. 8C shows yet another magnet of a magnetic disk drive in accordance with an embodiment of the present invention. This yet another magnet has a wider width at the end of outer circumferential side (right-hand on the drawing).

In this embodiment, magnet 19 is described to have a shape shown in FIG. 1, 5A or 7A; however, the disk drive of the present invention is not limited to these shapes of magnet 19. FIGS. 8A-8C show other instances of the magnet to be used in disk drive 23. FIGS. 8A and 8C show magnet 61, 63 of which each end on the outer rim (right side of the drawings) has a wider width, and FIG. 8B show magnet 62 of which both ends have wider widths. Use of these magnets 61-63 can produces a similar advantage to that of magnet 19 used in this embodiment.

In this embodiment, CSS area "B" is described existing at the inner circumferential side of medium 12; however, in the case of placing CSS area "B" at the outer circumferential side of medium 12, a similar advantage to what is discussed above is obtainable provided the following structure is employed: magnet 19 has a wider width at its left end in FIG. 1 than its center, keep-solenoid 50 is placed on the left side of head supporting unit 9, and the positional relation in FIG. 2 between upper yoke 20 and magnet 19 is changed upside down.

Figure 9:
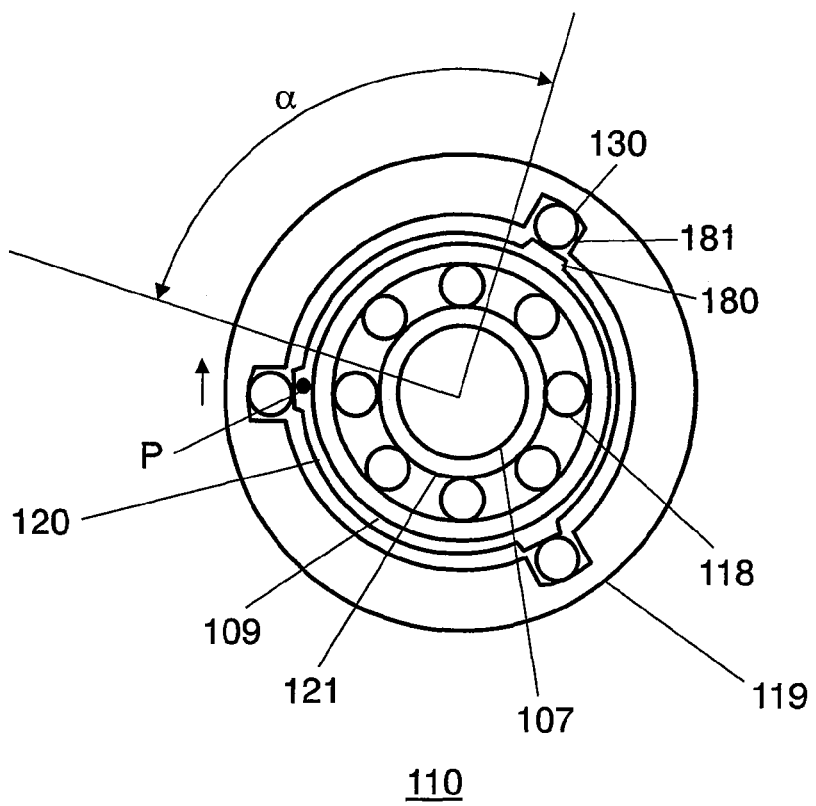
FIG. 9 shows a plan view illustrating a structure of another limiter in accordance with an embodiment of the present invention.

In this embodiment, keep-solenoid 50 is used as a limiter that limits the rotating action of supporting arm 2 along the recording surface of medium 12; however, the limiter of the present invention is not limited to this instance. FIG. 9 shows a plan view illustrating another limiter. As shown in FIG. 9, this another limiter in accordance with the embodiment employs a one-way clutch mechanism in bearing 110 of supporting arm 2. Bearing 110 comprises the following elements:
  mounting screws 107 for mounting respective structural elements to chassis 15 (not shown in FIG. 9);
  inner ring 121 to be mounted to chassis 15 by screws 17;
  outer ring 109 held rotatably with respect to inner ring 121 by a plurality of balls;
  fixed cam 119 placed outside outer ring 109, fixed to chassis 15 and having recesses 181;
  movable cam 120 coupled to outer ring 109 and having protrusions 180 corresponding to recess 181; and
  outer balls 130 placed in respective recesses 181 of fixed cam 119 such that each one of outer balls 130 touches each one of protrusions 180 of movable cam 120.

Supporting arm 2 is mounted to outer ring 109 of bearing 110 or movable cam 120, and rotates accompanying the rotation of outer ring 109 and movable cam 120. Movable cam 120 can be made of metal or resin.

The limiter shown in FIG. 9 shows the status where protrusions 180 of movable cam 120 are brought into contact with outer balls 130, in this status the magnetic head provided to slider 1 on supporting arm 2 is placed above CSS area "B". In FIG. 9, when the magnetic head is placed above the recoradable area "A", point "P", where protrusions 180 of movable cam 120 are provided, rotates within range "α" free from touching outer balls 130.

The foregoing structure in FIG. 9 allows movable cam 120 to rotate within range "α" arbitrarily during the regular operation of reading or reproducing data, i.e. while the magnetic head is placed above recordable are "A" of medium 12. During the operation at rest, i.e. when the magnetic head is parked in CSS area "B" of medium 12, protrusions 180 of movable cam 120 are retained as they touch outer balls 130 placed in fixed cam 119 as shown in FIG. 9, so that no electric current is applied for generating magnetic force. The movement of movable cam 120 is mechanically halted and supporting arm 2 can be retained. On top of that, use of the one-way clutch mechanism shown in FIG. 9 allows protrusions 180 of movable cam 120 to be engaged into outer balls 130 for locking movable cam 120 while disk drive 23 stays at rest and when an external shock due to a drop of the apparatus or the like is applied disk drive 23. Because inertia force in the same direction (e.g. the arrow mark in FIG. 9) is applied to both of outer balls 130 and protrusions 180 of movable cam 120. As a result, a structure excellent in shock resistance is obtainable.

Disk drive 23 in accordance with this embodiment is not detailed its bearing structure thickness-wise, because the known structures can be applicable to the bearing. However, an intention of lowering the height (H) of disk drive 23 encourages the employment of, e.g. the bearing of which structure is illustrated in FIG. 10, which shows a sectional view illustrating a structure of another instance of the bearing in accordance with this embodiment.

Figure 10:
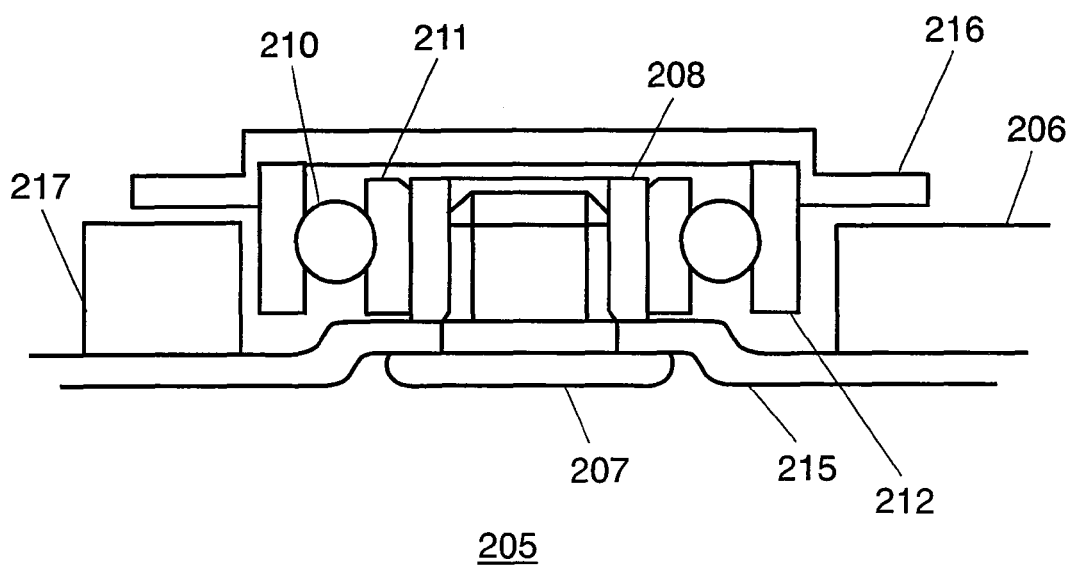
FIG. 10 shows a sectional view illustrating a structure of another bearing in accordance with an embodiment of the present invention.
Figure 11:
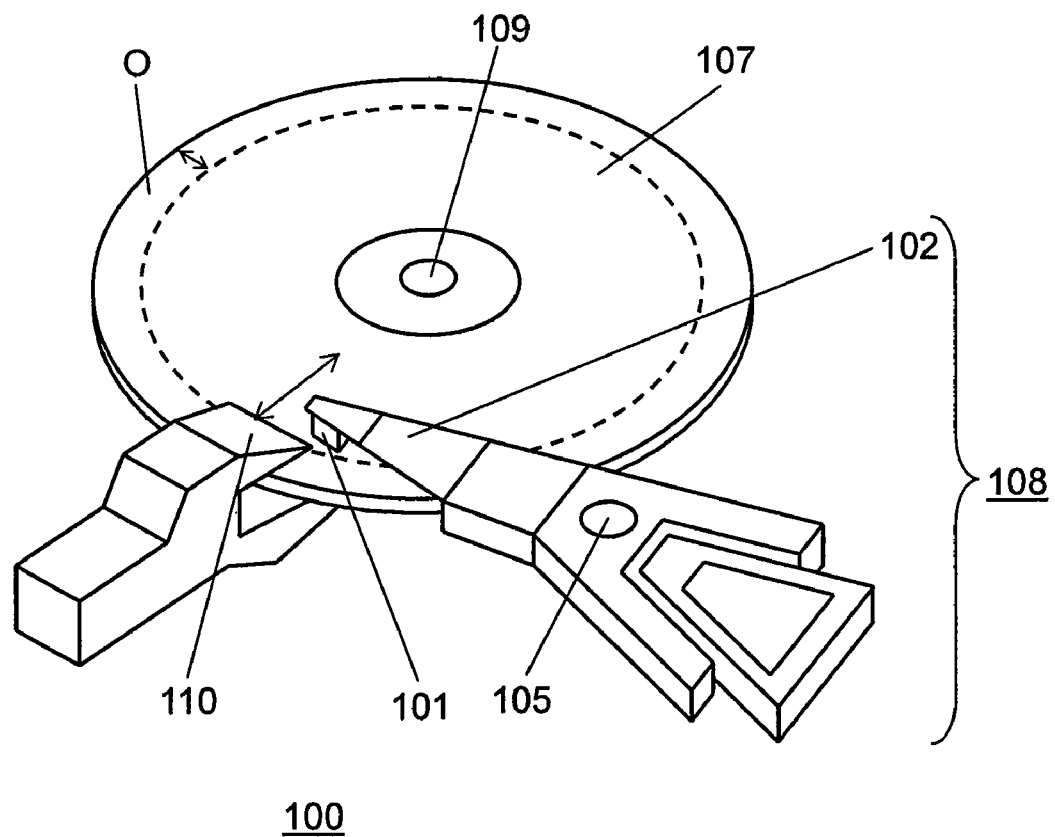
FIG. 11 shows a perspective view schematically illustrating a structure of a conventional L/UL method magnetic disk drive.
Figure 12:
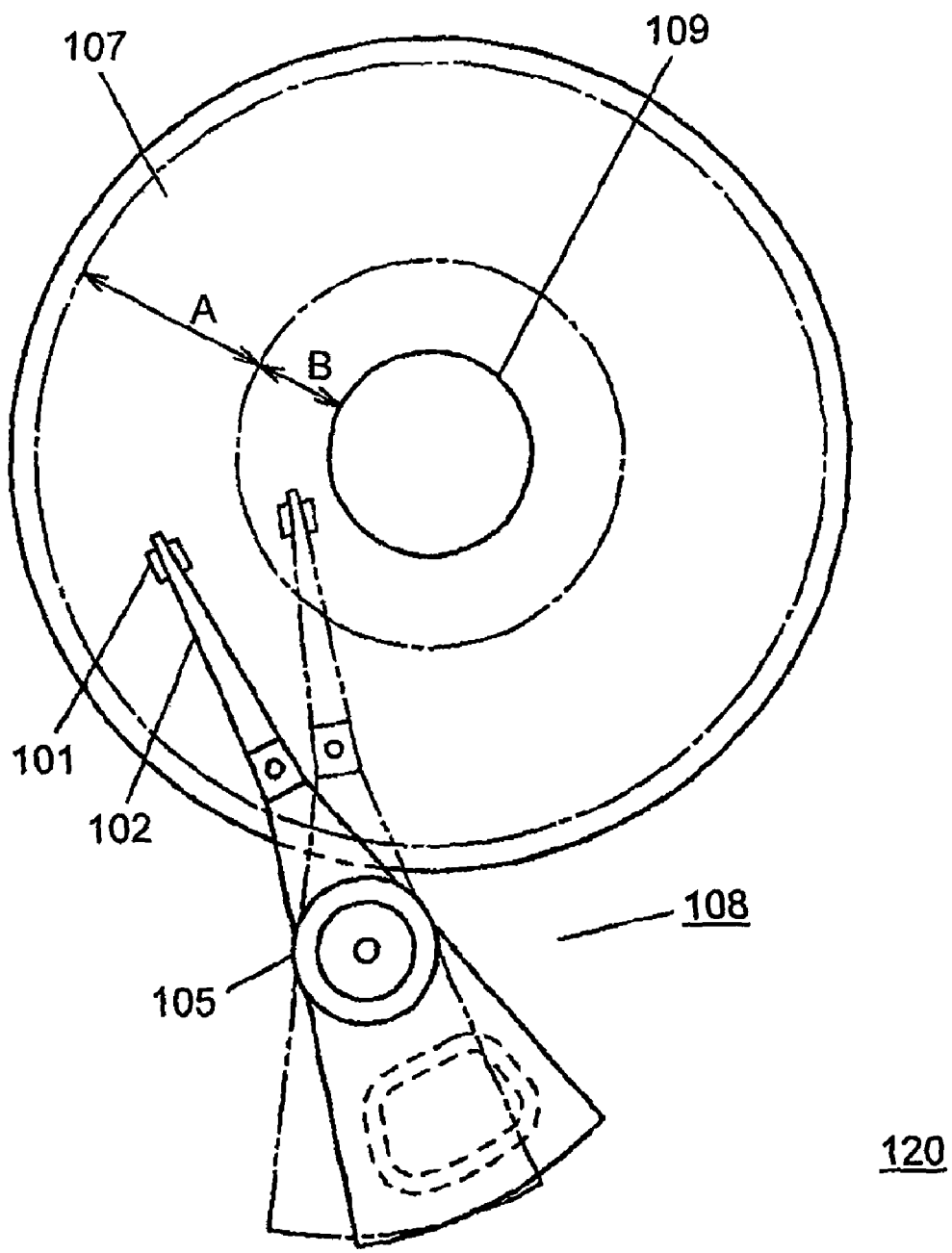
FIG. 12 illustrates a structure of a conventional CSS system magnetic disk drive.

As shown in FIG. 10, bearing 205 in accordance with this embodiment comprises the following elements:

fixing screw 207 for fixing respective structural elements to chassis 215;

collar 208 screwed by fixing screw 207;

inner ring 211 mounted to collar 208;

outer ring held rotatably with respect to inner ring 211 via a plurality of balls 210; and flange 216 for covering the upper side of outer ring 212 in FIG. 10 and extending to both the sides of bearing 205 in FIG. 10.

Flange 216 is made of soft magnetic material, and magnet 206 extends to just under the right side (as shown in FIG. 10) of flange 216. In addition, auxiliary magnet 217 is placed under the left side (left side in FIG. 10) of flange 216. Supporting arm 2 is placed over flange 216, i.e. at the upper side in FIG. 10.

The structure shown in FIG. 10 allows attracting flange 216 toward chassis 215 by the magnetic force of magnets 206 and 217, so that plural steps of balls 210 are not needed, and a single step of balls 210 can maintain the positional relation between inner ring 211 and outer ring 212, which thus become hard to come off from each other. As a result, bearing 205 can be slimmed, which greatly assists the magnetic disk drive as a whole to be slimmed.

In this embodiment, the magnetic disk drive employing the magnetic head is described; however, the disk drive of the present invention can be used as a non-contact recording and reproducing disk drive such as an optical disk drive, a magneto-optic disk drive with a similar advantage to what is discussed previously.

INDUSTRIAL APPLICABILITY

The present invention can provide a CSS system disk drive excellent in durability, so that the present invention is useful for a disk drive employing a magnetic head, optical head, or magneto-optic-head, in particular, a disk drive having a CSS system head supporting unit.

The invention claimed is:

1. A disk drive comprising:
a recording medium rotatably supported;
a rotary section for spinning the recording medium;
a slider having a head;
a supporting arm having the slider at a first end thereof such that the slider faces the recording medium and a vertically depressable second end;
a bearing for holding the supporting arm rotatably along a recording surface of the recording medium and holding the supporting arm pivotably in a vertical direction with respect to the recording surface;
an elastic section for applying thrusting force to the first end of the supporting arm toward the recording medium; and
a driver for rotating the supporting arm along the recording surface of the recording medium;
wherein when the driver rotates the supporting arm along the recording surface of the recording medium and then parks the head at a given evacuation area on the recording medium, the vertically depressable second end of the supporting arm is depressed for reducing the thrusting force applied by the elastic section to the first end of the supporting arm, and
wherein the driver includes a coil disposed at the second end of the supporting arm and a magnet which applies magnetic field to the coil, wherein an electric current running through the coil and the magnetic field generated by the magnet produce Lorentz force in a vertical direction with respect to the recording medium, which depresses the vertically depressable second end of the supporting arm.

2. The disk drive of claim 1, wherein the magnet is formed such that while the head is parked at the given evacuation area on the recording surface, a width of the magnet at its side, where an end of the coil is placed, is greater than a width of the magnet at its center.

3. The disk drive of claim 2, wherein the end of the coil is placed outside an end of the magnet while the head is parked at the given evacuation area on the recording surface.

4. The disk drive of claim 3 further comprising a limiter for limiting rotating action of the supporting arm along the recording surface when the head disposed on the supporting arm is parked at the given evacuation area.

5. The disk drive of claim 4, wherein the limiter includes a magnet and the supporting arm has a contacting section to the limiter, which contacting section is made of magnetic material, wherein the limiter limits the rotating action of the supporting arm with magnetic force of the magnet.

6. The disk drive of claim 5, wherein the limiter includes a solenoid wound on the magnet, and the limit imposed on the rotating action is released by magnetic force generated by an electric current applied to the solenoid.

7. The disk drive of claim 3, wherein the driver reduces the thrusting force by an amount equal to or smaller than the thrusting force applied by the elastic section to the supporting arm.

8. The disk drive of claim 3, wherein the elastic section is formed of a leaf spring disposed between the bearing and the supporting arm.

9. The disk drive of claim 8, wherein a center of gravity of a section of the supporting arm, which section is held by the elastic section, is positioned on an axis of pivoting center of the supporting arm pivoting vertically with respect to the recording surface of the recording medium.

10. The disk drive of claim 3, wherein the supporting arm includes a gimbal mechanism for supporting the slider movably along a rolling direction and a pitching direction.

11. The disk drive of claim 3 further comprising a pivot bearing disposed between the bearing and the supporting arm, which pivot bearing includes a pair of apexes that act as fulcrum for the supporting arm to pivot vertically with respect to the recording surface.

12. The disk drive of claim 11, wherein the pair of apexes provided to the pivot bearing are disposed on a line vertical with respect to an axial direction of the bearing and a longitudinal direction of the supporting arm as well, which line extends through a rotary center of the bearing when the bearing rotates along a radius direction of the recording medium.

13. The disk drive of claim 11, wherein the pair of apexes of the pivot bearing are disposed symmetrically with respect to a longitudinal center line of the supporting arm.

14. A disk drive comprising:
a recording medium rotatably supported;
a rotary section for spinning the recording medium;
a slider having a head;
a supporting arm having the slider at a first end thereof such that the slider faces the recording medium and a vertically depressable second end;
a bearing for holding the supporting arm rotatably along a recording surface of the recording medium and holding the supporting arm pivotably in a vertical direction with respect to the recording surface;
an elastic section for applying thrusting force to the first end of the supporting arm toward the recording medium;
a driver for rotating the supporting arm along the recording surface of the recording medium;
wherein when the driver rotates the supporting arm along the recording surface of the recording medium and then parks the head at a given evacuation area on the recording medium, the vertically depressable second end of the supporting arm is depressed for reducing the thrusting force applied by the elastic section to the first end of the supporting arm;
wherein the driver includes a coil disposed at the second end of the supporting arm and a magnet which applies magnetic field to the coil, wherein an electric current running through the coil and the magnetic field generated by the magnet produce Lorentz force, which depresses the second end of the supporting arm;
wherein the magnet is formed such that while the head is parked at the given evacuation area on the recording surface, a width of the magnet at its side, where an end of the coil is placed, is greater than a width of the magnet at its center and the end of the coil is placed outside an end of the magnet while the head is parked at the given evacuation area on the recording surface; and
a limiter for limiting rotating action of the supporting arm along the recording surface when the head disposed on the supporting arm is parked at the given evacuation area and wherein the limiter is formed of a one-way clutch mechanism provided to the bearing.

15. A disk drive comprising:
a recording medium rotatably supported;
a rotary section for spinning the recording medium;
a slider having a head;
a supporting arm having the slider at a first end thereof such that the slider faces the recording medium and a vertically depressable second end;
a bearing for holding the supporting arm rotatably along a recording surface of the recording medium and holding the supporting arm pivotably in a vertical direction with respect to the recording surface;
an elastic section for applying thrusting force to the first end of the supporting arm toward the recording medium; and
a driver for rotating the supporting arm along the recording surface of the recording medium;
wherein when the driver rotates the supporting arm along the recording surface of the recording medium and then parks the head at a given evacuation area on the recording medium, the vertically depressable second end of the supporting arm is depressed for reducing the thrusting force applied by the elastic section to the first end of the supporting arm;
wherein the driver includes a coil disposed at the second end of the supporting arm and a magnet which applies magnetic field to the coil, wherein an electric current running through the coil and the magnetic field generated by the magnet produce Lorentz force, which depresses the second end of the supporting arm;
wherein the magnet is formed such that while the head is parked at the given evacuation area on the recording surface, a width of the magnet at its side, where an end of the coil is placed, is greater than a width of the magnet at its center and the end of the coil is placed outside an end of the magnet while the head is parked at the given evacuation area on the recording surface; and
wherein the bearing includes an inner ring, balls, an outer ring, and a flange that covers the inner ring, the balls and the outer ring, wherein the bearing attracts the flange with magnetic force of the magnet.

* * * * *